(12) United States Patent
Sommer et al.

(10) Patent No.: US 7,769,295 B2
(45) Date of Patent: Aug. 3, 2010

(54) DUAL BEAM SPLITTER OPTICAL MICRO-COMPONENTS AND SYSTEMS AND METHODS EMPLOYING SAME

(75) Inventors: Rad Sommer, Sebastopol, CA (US); Jill Oosterom, Ottawa (CA); Claude Gamache, Gatineau (CA)

(73) Assignee: Bookham Technology plc, Towcester, Northamptonshire (GB)

( * ) Notice: Subject to any disclaimer, the term of this patent is extended or adjusted under 35 U.S.C. 154(b) by 486 days.

(21) Appl. No.: 11/845,596

(22) Filed: Aug. 27, 2007
(Under 37 CFR 1.47)

(65) Prior Publication Data
US 2008/0050127 A1 Feb. 28, 2008

Related U.S. Application Data

(60) Provisional application No. 60/840,136, filed on Aug. 25, 2006.

(51) Int. Cl.
*H04J 14/02* (2006.01)
*H04B 10/00* (2006.01)
*H04B 10/04* (2006.01)
*H04B 10/06* (2006.01)

(52) U.S. Cl. ............................. 398/82; 398/86; 398/88; 398/212; 398/201; 398/169

(58) Field of Classification Search .................... 398/68, 398/82, 85, 86, 88, 168–170, 200, 201, 207, 398/212, 214
See application file for complete search history.

(56) References Cited

U.S. PATENT DOCUMENTS 6,275,328 B1 8/2001 Parry et al.

(Continued)

FOREIGN PATENT DOCUMENTS

EP 1 033 794 A1 9/2000

(Continued)

OTHER PUBLICATIONS

International Search Report issued in PCT/GB2005/050029.

(Continued)

*Primary Examiner*—Dalzid Singh
(74) *Attorney, Agent, or Firm*—Banner & Witcoff, Ltd.

(57) ABSTRACT

A micro-optic dual beam-splitter assembly comprises at least two beam-splitter optical filters and at least one photoreceptor. Each of the beam-splitter optical filters comprises an optical substrate having at least a coated or uncoated optical tap surface and a filter surface carrying a thin-film optical filter. The thin-film optical filters are substantially normal to the optical path from an optical signal source. Each of the optical tap surfaces is operative as an optical beam splitter to tap off an optical tap signal. The one or more photoreceptors are arranged to receive both or at least one of the optical tap signals. The tap signals comprise a portion of the optical signals passed along the optical path to the optical filter chips. The filter chips are cooperatively transmissive to an optical signal output port of a selected set of wavelengths received from the optical signal source along the optical path, and are reflective of other wavelengths. Each of the one or more photoreceptors are operative to pass tap signals to a corresponding tap signal output port, either as optical or electrical signals. Various different embodiments of the disclosed micro-optic dual beam-splitter assemblies are useful as TOSAs, ROSAs, gain-flattening filters for optical amplifiers, or other applications.

25 Claims, 4 Drawing Sheets

U.S. PATENT DOCUMENTS

| | | |
|---|---|---|
| 6,445,493 B2 | 9/2002 | Kohnke et al. |
| 6,611,371 B2 | 8/2003 | Wigley et al. |
| 6,765,665 B2 * | 7/2004 | Heffner et al. ............... 356/213 |
| 2003/0123135 A1 | 7/2003 | Terahara |
| 2003/0179997 A1 | 9/2003 | Hwang et al. |
| 2004/0179784 A1 * | 9/2004 | Vancoille et al. ............... 385/47 |
| 2009/0202244 A1 * | 8/2009 | Jin et al. ....................... 398/67 |

FOREIGN PATENT DOCUMENTS

| | | |
|---|---|---|
| EP | 1 073 220 A1 | 1/2001 |
| JP | 2003329830 | 11/2003 |
| WO | WO 00/45479 | 8/2000 |

OTHER PUBLICATIONS

Written Opinion issued in PCT/GB2005/050029.

* cited by examiner

Fig. 4

| θ | φ | γ | ξ | ψ | ω | σ | Walkoff (mm) |
|---|---|---|---|---|---|---|---|
| 40 | 25.4 | 14.6 | 24.6 | 38.7 | 39.3 | 71.6 | 0.521930469 |
| 41 | 25.9 | 15.1 | 23.1 | 36.0 | 38.1 | 67.8 | 0.521930469 |
| 42 | 26.5 | 15.5 | 21.5 | 33.4 | 37.0 | 64.6 | 0.538279746 |
| 43 | 27.0 | 16.0 | 20.0 | 30.8 | 35.9 | 61.6 | 0.554491561 |
| 44 | 27.6 | 16.4 | 18.4 | 28.3 | 34.8 | 58.9 | 0.571850912 |
| 45 | 28.1 | 16.9 | 16.9 | 25.8 | 33.7 | 56.4 | 0.589099068 |
| 46 | 28.7 | 17.3 | 15.3 | 23.4 | 32.7 | 54.1 | 0.606674091 |
| 47 | 29.2 | 17.8 | 13.8 | 21.0 | 31.6 | 51.9 | 0.624590631 |
| 48 | 29.7 | 18.3 | 12.3 | 18.6 | 30.6 | 49.8 | 0.642864014 |
| 49 | 30.2 | 18.8 | 10.8 | 16.3 | 29.6 | 47.8 | 0.661510285 |
| 50 | 30.7 | 19.3 | 9.3 | 14.0 | 28.6 | 45.9 | 0.680546253 |
| 51 | 31.2 | 19.8 | 7.8 | 11.7 | 27.6 | 44.0 | 0.699989539 |
| 52 | 31.7 | 20.3 | 6.3 | 9.5 | 26.6 | 42.2 | 0.719858632 |
| 53 | 32.2 | 20.8 | 4.8 | 7.3 | 25.7 | 40.5 | 0.740172944 |
| 54 | 32.6 | 21.4 | 3.4 | 5.0 | 24.7 | 38.9 | 0.760952872 |
| 55 | 33.1 | 21.9 | 1.9 | 2.9 | 23.8 | 37.3 | 0.782219867 |

DUAL BEAM SPLITTER OPTICAL MICRO-COMPONENTS AND SYSTEMS AND METHODS EMPLOYING SAME

CROSS-REFERENCED APPLICATION AND PRIORITY CLAIM

This application claims the priority benefit of U.S. provisional patent application Ser. No. 60/840,136, filed on Aug. 25, 2006, entitled "Dual Beam Splitter Optical Micro-Components and Systems and Methods Employing Same".

FIELD OF THE INVENTION

The present invention is directed to optical signal applications, including components, devices, systems and methods for generating and/or processing optical signals, especially applications in which multiple functions, such as optical filtering and signal monitoring, are to be accomplished in a compact housing. Certain aspects of the present invention are directed to fiber optic communication systems incorporating or otherwise using such components, devices, systems and methods.

BACKGROUND

Optical components, e.g., assemblies and sub-assemblies of optical telecommunication systems, may be constrained to small packages by design requirements or system performance or cost objectives. Typical of such size-constrained optical components, for example, are certain transmitter optical subassemblies (TOSAs), receiver optical subassemblies (ROSAs) (TOSAs and ROSAs being referred to here also as OSAs), and the like. A TOSA typically includes a laser chip to convert electrical signals into corresponding optical signals passed to an output port coupled (i.e., optically coupled) to an optical output fiber. A ROSA typically receives optical signals from an input fiber and converts them to corresponding electrical signals. OSAs and other optical components must efficiently process and communicate optical signals to or from a light source, e.g., an illuminated fiber in the case of a ROSA, and a laser in the case of a TOSA. Coupling efficiency requirements typically are determined by the applicable system specifications. Difficulties often are encountered in attempting to package additional functionality, e.g., power monitoring, frequency (or wavelength) monitoring etc., into size-constrained housings of these and other optical components.

TOSAs include directly modulated lasers (DMLs), such as semiconductor distributed feedback (DFB) DMLs. DML transmitters can enable a compact system with good response to modulation. Optical multi-filter discriminators are disclosed in co-pending U.S. patent application Ser. No. 60/755,614, filed by Sommer et al. on Dec. 30, 2005 and entitled "Optical Discriminators and Systems and Methods," the entire disclosure of which is hereby incorporated by reference for all purposes. At least certain embodiments of the multi-filter discriminators disclosed in the Sommer et al. patent application can be used in filtered DML designs, i.e., DMLs having typically two thin film optical filters to improve the signals, e.g., to improve the extinction ration and, so, the travel range of the signals. However, difficulties are encountered in attempting to package additional functionality into the housing or packaging of such filtered DML transmitters. There often is insufficient space in the housing for the laser chip and associated components and filter chips plus beam splitters that could serve to tap off a portion of the optical signal to a photoreceptor (also referred to as photoreceiver) to monitor optical signal power, frequency and/or other properties of the optical signals handled by the TOSA. This may be the case, for example, in a TOSA housing compliant with the Multi-Source Agreement (MSA) of 10 Gbit/s Miniature Device (XMD), XMD04 Physical Interface of LC TOSA Type 2 Package, Rev. 1.2, Jan. 17, 2006. Likewise, packaging difficulties often are encountered in attempting to incorporate additional functionality into the housings of other small optical components. Similarly, it may be difficult to accommodate beam splitters along with the multiple filter chips in optical amplifiers employing multiple gain-flattening filters (GFFs), e.g., in the packaging for multi-chip filter components for gain-flattened optical amplifiers, such as various embodiments of the GFF components disclosed in U.S. patent application Ser. No. 10/874,559, filed Jun. 23, 2004, the entire disclosure of which is hereby incorporated by reference for all purposes.

In these and other applications employing optical filtering, and especially applications using multiple optical thin film filters, it may be difficult to accommodate beam splitters in the optical component's package, e.g., in its specified housing dimensions. It may be difficult or impossible to incorporate beam splitters in such cases even if they were provided as thin film filter chips, in view of the package space limitations.

Accordingly, it is an object of the present invention to provide optical components, devices, systems and methods employing multiple optical filters with dual beam-splitter functionality. In accordance with certain selected aspects of the inventive subject matter disclosed, components, devices, systems and methods are provided for handling (i.e., for generating or processing) optical signals, which employ multiple optical filters together with multiple beam-splitter functionality. Additional objects and features will be apparent to those skilled in the art given the benefit of this disclosure.

SUMMARY

In accordance with one aspect of this disclosure, a micro-optic dual beam-splitter assembly comprises a housing having an optical signal output port and an optical path in the housing from an optical signal source to the optical signal output port. At least two beam-splitter optical filter chips are mounted in the housing in the optical path between the optical signal source and the optical signal output port. Each such filter chip comprises an optical substrate having at least a filter surface, an optical tap surface, and a thin-film optical filter on the filter surface. Each of the thin-film optical filters, as oriented in the housing, is substantially normal to the optical path incident on the thin-film optical filter. At least one photoreceptor also is mounted in the housing. Each of the optical tap surfaces, as oriented in the housing, is operative as an optical beam splitter to tap off optical tap signals comprising a portion of the optical signals passed along the optical path to the optical filter chip. The optical filter chips, as oriented in the housing, are cooperatively transmissive to the optical signal output port of a selected set of optical signal wavelengths received from the optical signal source along the optical path and are reflective of other wavelengths received from the optical signal source. Each photoreceptor is operative and arranged in the assembly to receive optical tap signals from one or more of the tap surfaces, and to pass a corresponding tap signal to a tap signal output port. In certain exemplary embodiments the micro-optical dual beam splitter assembly comprises two photoreceptors, each operative to receive optical tap signals from at least one of the tap surfaces and to pass corresponding tap signals to one or more (the same or different) tap signal output ports.

In accordance with another aspect of this disclosure, a micro-optic dual beam-splitter assembly comprises first and second photoreceptors and first and second optical filter chips in the optical path between an optical signal source and an optical signal output. The optical filter chips each has an optical substrate providing a thin-film optical filter on a filter surface and in addition an optical tap surface. Each thin-film optical filter is oriented substantially normal to the optical path incident on the thin-film optical filters. Each optical tap surface is operative as an optical beam splitter to tap off an optical tap signal to a corresponding one of the photoreceptors. That is, a second surface of each of the multiple filter chips is operative as a beam-splitter to tap off to its respective photoreceptor a minor portion of the optical signals passed along the optical path to the optical filter chips from the optical signal source. The first and second optical filter chips are configured and oriented to be cooperatively transmissive to the optical signal output port of a selected set of wavelengths received from the optical signal source along the optical path. They are reflective of other wavelengths received from the optical signal source along the optical path. The optical tap surfaces may be broadband or operative, as oriented, to tap off selective wavelengths, e.g., a supervisory channel, power or frequency monitoring wavelengths, etc. Typically, the tap surfaces are operative, as oriented in the assembly, to tap off a channel or wavelength different from each other. Alternatively, the tap surfaces are operative, as oriented in the assembly, to tap off the same or overlapping channel or wavelengths. Each of the photoreceptors may comprise a lens or other optical signal collector for the optical tap signals and be operative to pass the optical tap signals as optical signals. Alternatively, either or both of the photoreceptors may comprise a photodiode or other components to convert the optical tap signals into corresponding electrical signals, etc. It will be understood that the aforesaid selected set of wavelengths may comprise, for example, a wavelength band in each of one or more distinct optical channels. The optical tap signal may be a wavelength band (e.g., a channel), an individual wavelength or a broadband signal.

In accordance with another aspect of this disclosure, a micro-optic dual beam-splitter assembly comprises a housing having an optical signal output port, first and second tap signal output ports, an optical path (or primary optical path) in the housing from an optical signal source to the optical signal output port; first and second photoreceptors mounted in the housing and first and second optical filter chips mounted in the housing in the optical path between the optical signal source and the optical signal output port. Each of the first and second optical filter chips comprises an optical substrate having at least a filter surface (or primary filter surface), an optical tap surface and a thin-film optical filter (or primary optical filter) on the filter surface. The thin-film optical filters, as oriented in the housing, each is substantially normal (as that term is further described below) to the primary optical path. Each of the optical tap surfaces, as oriented in the housing, is operative as an optical beam splitter to tap off a corresponding optical tap signal to the corresponding photoreceptor. The optical tap signals are a minor portion of the optical signals passed along the optical path to the optical filter chips. The first and second optical filter chips, as oriented in the housing, are cooperatively transmissive to the optical signal output port of a selected set of optical signal wavelengths received from the optical signal source along the optical path. They are reflective of other wavelengths received from the optical signal source along the optical path. In certain exemplary embodiments at least one of the optical tap surfaces is operative as an optical beam splitter to tap off by reflection or refraction to the corresponding photoreceptor optical tap signals consisting essentially of predetermined tap signal wavelengths and to transmit other wavelengths incident on the tap surface along the primary optical path. Such predetermined tap signal wavelengths may include or not the aforesaid selected set of optical signal wavelengths transmitted by the filter chips to the optical signal output port. In certain embodiments at least one of the optical tap surfaces is operative as a broadband optical beam splitter to tap off to the corresponding one of the photoreceptors optical tap signals including most or all wavelengths incident on the optical tap surface, including at least a portion of the aforesaid selected set of optical signal wavelengths transmitted to the optical signal output port.

In certain embodiments of the micro-optic dual beam-splitter assembly further described below, the optical signal source comprises a lens, in some cases here referred to as an optical source lens. For example, the multiple filter chips can be mounted in a housing and an optical fiber provided to carry optical signals, e.g., from an amplifier comprising erbium doped (optical) fiber amplifier ("EDFA") or the like, into the housing to an optical source lens mounted in the housing. In such embodiments, the filter chips can provide, for example, gain-flattening for the amplified optical signals and, by their tap surfaces, monitoring, etc. In other exemplary embodiments of the micro-optic dual beam-splitter assemblies disclosed here, the optical signal source comprises a laser, e.g., a DML laser comprising a laser chip mounted in the housing and feed-throughs operative to pass RF and DC signals into the housing to the laser to generate corresponding optical signals. The optical signals generated by the laser are passed along the optical path, optionally through an optical source lens, and then filtered by the optical filters of the filter chips, tapped by the tap surfaces (thin film coated or not) of the filter chips, and optionally otherwise processed. In such embodiments, the filter chips can provide, for example, improved extinction ratio for the optical signals to increase their travel reach in an optical fiber downstream of the laser. It will be apparent to those of ordinary skill in the art, that any of numerous other components can be packaged in the same housing or otherwise coupled optically, electrically, etc. with those elements mentioned above. Exemplary such optional features include lenses, ferrules, isolators, collimators, wavelength analyzers, multiplexers, demultiplexers, fiber coils, such as doped fibers for optical signal amplification, etc.

In accordance with another aspect, micro-optic beam splitter assemblies are provided which include two (or more) optical filter elements and a corresponding photoreceptor for each of the optical filter elements, optionally and typically along with other components, features or elements. Such optical filter elements are optically coupled to each other, for example, being immediately adjacent each other across an air gap or optically bonded to each other. Each comprises a coated optical substrate. In at least certain exemplary embodiments each such substrate is on the order of 1 mm×1 mm×1 mm and has a thin film filter on one surface and a second surface, e.g., a nominally or substantially oppositely facing surface of the substrate, which is designed to tap off a small amount the optical signals reaching the optical filter element. The optical signals tapped off can be used for such purposes as power monitoring, wavelength or amplitude monitoring, etc., and in certain exemplary embodiments comprise a minor portion of the main optical signals processed by the assembly. Each of the tap surfaces is uncoated or has a thin film optical coating. In certain embodiments the tap surface is uncoated and uses the difference in index of refraction of the substrate and air to reflect or refract the tap signal to a photoreceptor. The assemblies are designed such that the main optical beam passes through the filter surfaces of the two filter chips at or near zero degrees angle of incidence (AOI), e.g., less than about 2 degrees, and in certain exemplary embodiments less than or about 1 degree AOI. Especially in those embodiments of the disclosed micro-optic beam splitter assemblies in which the thin film optical filters face each other across a narrow air gap, the slight angle of the AOI above zero degrees can assist in avoiding an etaloning effect between them. They layout such that the beam is at or near normal incidence to the filter surface, thus avoiding the degradation of the filter shape with angle, the steep wavelength shift at large angle, and the affect of temperature gradients on wavelength shift at large angles. Such near zero angle may in some instances be referred to as nominally normal, meaning the optical beam is incident on the thin film filter (from the substrate side or from the free or air side of the filter) nominally normal to the plane of the thin-film filter. The optical layout of the two filter chips in the assembly is such that the optical tap surface of each, which may be thin-film coated or uncoated, each is at an angle operative to reflect or refract a portion of the optical beam, such as to a monitor port.

The design of at least certain exemplary embodiments of the micro-optic beam splitter assemblies disclosed here is such they can fit into a micro-optical package that otherwise could not well accommodate two thin film filters, two beam splitters and two photodiode chips or other photoreceptors and other required components or features. In certain exemplary embodiments the micro-optic dual beam-splitter assembly comprises a housing, and in certain embodiments the housing is not larger than 25 mm by 15 mm by 15 mm, not including any leads, feed throughs, heat radiation planes, externally mounted printed circuits, ferrules, exit fiber assemblies and mounting fixtures. In certain especially commercially significant embodiments the housing is not larger than 25 mm by 6 mm by 6 mm, again not including any leads, feed throughs, heat radiation planes, externally mounted printed circuits, ferrules, exit fiber assemblies and mounting fixtures. For example, certain exemplary embodiments are operative as a TOSA and the housing has overall dimensions compliant with Multi-source Agreement (MSA) of 10 Gbit/s Miniature Device (XMD), XMD04 Physical Interface of LC TOSA Type 2 Package, Rev. 1.2, Jan. 17, 2006.

Those of ordinary skill in the art will recognize that various embodiments of the optical multi-filter discriminators, optical communication systems and methods of operating an optical communication system disclosed here represent a significant technological advance and can provide significant advantages. For certain exemplary embodiments these advantages stem at least in some degree from the compactness provided by using each of multiple filter chips to provide both a primary optical filter on one surface and an optical tap on a second surface. Good design flexibility and performance can be achieved with the multi-filter designs disclosed here. More generally, it will be recognized from this disclosure and the following description of certain exemplary embodiments that optical multi-filter discriminators and optical signal systems can be achieved which are compact, have good performance, are economical to produce or have a combination of two or more of these advantages. Additional and optional features and advantages of the invention will be apparent from the following disclosure of certain preferred and exemplary embodiments. Various especially preferred embodiments have advantageous use in fiber optic telecommunication systems or other optical signal systems. It will be recognized by those skilled in the art, given the benefit of this disclosure, that there are numerous alternative embodiments of the components, systems, devices and methods disclosed here for treating or processing optical signals. In that regard, it is to be understood that features or elements of any described or disclosed embodiment is meant to be combinable or substitutable with or for any and all other features and elements, and all such permutations and combinations of features and elements are within the scope of the invention disclosed and claimed.

BRIEF DESCRIPTION OF THE DRAWINGS

Certain exemplary embodiments of the micro-optic dual beam-splitter assemblies disclosed here will be described below with reference to the attached drawings in which:

FIG. 4 is a chart showing exemplary suitable sets of values for the various angles, etc. identified in the filter chip configurations illustrated in FIG. 2 and FIG. 3.

Figure 1:
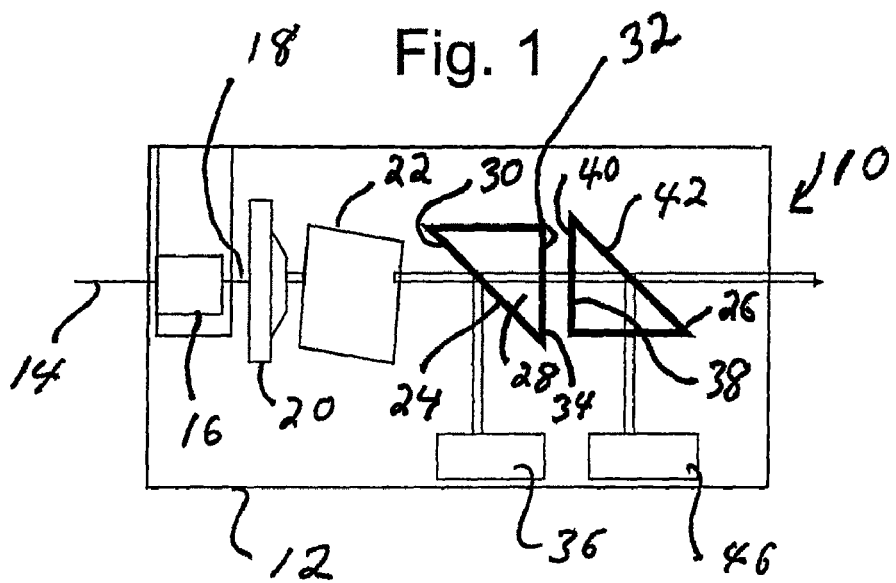
FIG. 1 is a highly schematic illustration of one suitable component layout for an exemplary embodiment of the micro-optic dual beam-splitter assemblies, specifically, a DML embodiment.

It should be understood that the drawings are not necessarily to scale. Certain items have been enlarged or otherwise altered in appearance for clarity or ease of illustration.

DETAILED DESCRIPTION OF CERTAIN EXEMPLARY EMBODIMENTS

It will be understood by those skilled in the art, that various different embodiments of the micro-optic dual beam-splitter systems, devices, components and methods disclosed here for treating or processing optical signals have numerous uses and applications. For purposes of illustration and not limitation, the further disclosure and description below focus mainly on DML assemblies suitable for fiber optic telecommunication systems. At least some embodiments of the micro-optic dual beam-splitter are suitable for use in other optical systems, e.g., as gain-flattening filters for optical amplifiers, wherein the multiple filter chips cooperatively provide gain-flattening to signals amplified by an EDFA or other optical amplifier, and the tap surfaces of the filters provide tap signals for power monitoring, frequency or wavelength monitoring or other purposes. That is, the optical filters serve to gain-flatten and perhaps otherwise improve the quality of optical signals received from the associated EDFA or other amplifier and the tap surfaces provide tap signals for monitoring, etc. In certain such embodiments configured as a gain-flattened optical amplifier, the thin film optical filters of the two (or more) optical filter chips incorporate also the technology disclosed in patent application Ser. No. 10/874,559, filed Jun. 23, 2004, the disclosure of which is hereby expressly incorporated herein in its entirety for all purposes. More generally, the components, devices, systems and methods disclosed here can be used in any application where multiple functions, such as, for example, filtering and monitoring, etc., are desired, especially where there are size or space limitations. Numerous applications and design variations will be apparent to those skilled in the art, given the benefit of this disclosure. Certain embodiments are suitable for dense wavelength division multiplexed telecommunications systems operating in the C-band. However, it will be readily apparent to those skilled in the art, given the benefit of this disclosure, that at least certain exemplary embodiments of systems, devices and methods in accordance with the principles disclosed here have application within the scope of the invention to other optical systems, including telecommunications systems operating in other wavelength bands or using other components.

Certain multi-filter discriminators in accordance with this disclosure can be configured in accordance with the technology of U.S. patent application Ser. No. 60/755,614, filed Dec. 30, 2005 and entitled Optical Discriminators and Systems and Methods, the entire disclosure of which is incorporated herein by reference for all purposes. Optionally, certain such embodiments of the micro-optic dual beam-splitter assemblies can be configured as DMLs incorporating multi-filter discriminators. In certain well designed embodiments of the micro-optic dual beam-splitter assemblies disclosed here, configured as TOSAs for a fiberoptic telecommunication system, e.g., a fiberoptic telecommunication system operating in the C-band in accordance with current technology, performance characteristics and standards, the dual filter chips can improve the extinction ratio of the optical signals in the one or more channels defined by the system and, so, achieve longer signal reach. In the case of such filtered DML embodiments, the first and second thin film optical filters of the first and second optical filter chips, respectively, serve cooperatively to improve the quality of optical signals generated by the associated laser. Each of the filter chips also taps off an optical tap signal to a corresponding photoreceptor.

Reference here to a filter being transmissive of certain optical signals or certain wavelengths means that the filter is substantially more transmissive of those certain wavelengths than it is of at least certain adjacent wavelengths, e.g., sufficiently transmissive of those signals to meet the insertion loss or other applicable performance requirements of the component, device, system or method, e.g., signal transmission system, in which the filter is used.

Certain embodiments of the devices, components, systems and methods disclosed here comprise only one photoreceptor. In some such embodiments, the signals from tap surfaces of the two or more beam-splitter filter chips can all go the one photoreceptor. In some such embodiments, the optical tap signals from the tap surface of one beam-splitter filter chip may be received by the one photoreceptor and the tap signals from the tap surface of the one or more other beam-splitter filter chip(s) may be ignored or passed elsewhere. One type of photoreceptor suitable for use in at least certain exemplary embodiments of the devices, components, systems and methods disclosed here is simply a lens to receive optical tap signals from the tap surface and then to pass the signals on (e.g., out of the housing) still as optical signals. In some of such embodiments, the optical signals from both tap surfaces can be received and passed on by the same one photoreceptor (e.g., by the same lens), the signals then being separated or otherwise separately analyzed or processed. Separation may be by angle of incidence, wavelength, etc. In this regard, the optical tap signals from the first tap surface may be of the same or different wavelengths as the optical signal from the second tap surface. In embodiments tapping off different wavelengths, it will be within the ability of those skilled in the art, given the benefit of this disclosure, to separate and/or separately process the tap signals. For tap signals of the same wavelength, the tap signals' different angles of incidence on the lens may in certain embodiments be used to yield correspondingly different exit directions from the lens.

As used here and in the appended claims, each of the one or more photoreceptors used in the devices, components, systems and methods disclosed here, e.g., typically, a first and second photoreceptor, can be any feature, device or assembly operative in the micro-optic beam splitter assembly to receive optical signals tapped off by the first or second optical tap surface of the filter chips, and either alone or in combination with other features or devices to process or transmit such tap signals. In various different embodiments the photoreceptors may be partially or entirely in or on the housing of the micro-optic beam splitter assembly (in all such cases being referred to as mounted in the housing). Depending upon the type of photoreceptor, the optical tap signals from the tap surface of the filter chips may, for example, be passed on or transmitted as corresponding electrical signals or optical signals, etc. That is, in certain exemplary embodiments the photoreceptor may process the optical tap signals to corresponding electrical tap signals or pass them through as processed or unprocessed optical signals. The tap signals, either as electrical or optical signals, typically are transmitted or passed out of the housing via corresponding tap output ports. Exemplary photoreceptors comprise, for example, photodiodes and/or other optical monitors operative to generate electrical signals corresponding to the optical tap signals. Other photoreceptors suitable for use in at least selected embodiments of the devices disclosed here include optical components to receive the optical tap signals and to pass them from the housing via the tap output port as optical signals. Thus, for example, depending upon the requirements of the particular application, any such photoreceptor may comprise a lens, etc. operative to receive the optical tap signals and to simply pass or transmit corresponding optical signals out of the housing via the tap output port. The tap output port may, e.g., comprise a suitable ferrule providing optical communication to an optical fiber, etc. Other photoreceptors suitable for use in all or selected embodiments will be apparent to those skilled in the art given the benefit of this disclosure.

The portion of the optical signal tapped off by the tap surface of a micro-beam splitter in the methods and devices disclosed here, is a minor portion of the total optical signal. That is, less than 10% of the total optical signal is tapped off by either of the micro-beam splitters (or by any of them in embodiments where more than three such beam splitters are used), i.e., less than 10% of the total optical power being passed along the optical path from the optical source to the output port. In certain exemplary embodiments less than 10% is removed of the selected wavelengths being improved and passed to the output port by the filters, and in other embodiments substantially none, e.g., less than about 0.5%, of the signal is removed in the selected wavelengths. In certain exemplary embodiments the tap surface is operative, as oriented in the optical path, to tap off less than 5% or even less than 1% of the signal. In certain exemplary embodiments the tap surface is operative to tap off all or substantially all of the optical signal in predetermined wavelengths, e.g., a monitoring wavelength to determine power level of the main signal, etc. In certain exemplary embodiments the tap surface is operative to tap off only a percentage (such as those percentages recited immediately above) of the entire spectrum of the optical signal being passed along the optical path to the beam splitter. Thus, in certain exemplary embodiments the optical tap signals tapped off from the optical path to the photoreceptors by the optical tap surfaces typically will be about 0.5% to 10% of the total optical power passed along the optical path from the optical source to the filter chips. In certain exemplary embodiments the tap signal is about 1% to 5% of the total optical power. For example, the uncoated surface of certain optical substrates has approximately a 1.5 index of refraction difference from air, and using such a chip surface as an optical tap surface yields approximately a 4% tap of C-band signals. The tap signal can be used for any purpose. The optical tap surface can tap off signals either broadband or in selected wavelengths, such as a monitoring or supervisory channel or the like. For example, the first and/or second tap signal can be fed to a wavelength analyzer. In certain exemplary embodiments the first tap signal is used for a power monitor and the second tap signal is used for a frequency monitor.

It should also be understood that while the exemplary embodiments described in more detail below comprise a single common housing in which at least all of the principal components are housed or packaged, alternative embodiments within the scope of this disclosure may employ multiple housings, sub-housings or no such housings.

As used here and in the appended claims, optical elements of a system, device or method in accordance with the present disclosure, e.g., optical components or features such as optical discriminators for signals generated by a DML, gain-flattening filters, optical amplifiers, isolators, multiplexers, collimators, etc., are "in optical series" along an optical pathway when they are optically coupled to one another so that one can pass optical signals to the other or receive optical signals passed by the other. Components are in optical series with one another along the optical pathway when they are optically coupled to each other so as to be operative to pass or propagate optical signals from one to the other (directly or indirectly) along the optical pathway traveled by the optical signals in the ordinary proper functioning of the system, device or method. Optical elements are in optical series with one another regardless whether they are upstream or downstream of one another along the optical pathway. Optical elements are optically coupled to one another directly in an arrangement wherein one can pass optical signals to the other or receive optical signals passed by the other with no intervening optical elements (other than free space or a passive waveguide or the like). Optical elements are optically coupled to one another indirectly in an arrangement wherein one can pass optical signals to the other or receive optical signals passed by the other with one or more other optical elements in the series intervening between them, e.g., an isolator, active waveguide (e.g., a coil of erbium doped fiber), a fused fiber mux or other multiplexer, etc. Thus, a component is in optical series with another component when it is arranged or operative to pass optical signals to the other component, either directly or indirectly (or to receive optical signals from the other component, again, either directly or indirectly). It will be understood by those skilled in the art, given the benefit of this disclosure, that a first component is "upstream" of a second component in the same system, device or method when optical signals are passed, tapped, sampled, reflected or otherwise processed by the first component prior to being processed by the second component as the optical signals travel along the intended optical path through the system, device or method during proper operation thereof. Likewise, the second or subsequent component is "downstream" of the first component.

The choice of optical signal source may or may not be critical to a particular application of an optical multi-filter discriminator in accordance with this disclosure. Suitable DMLs and other laser signal sources and other optical signal sources for use in various applications of the systems, devices and methods disclosed here are commercially available and will be apparent to those skilled in the art, given the benefit of this disclosure. Likewise, the precise wavelength(s) emitted by the optical signal source may or may not be critical to the particular application. Given the benefit of this disclosure, it will be within the ability of those skilled in the art to select a DML or other optical signal source and associated components suitable to the intended application.

It will also be recognized by those skilled in the art, given the benefit of this disclosure, that alternative and/or additional components may be employed in certain embodiments of the systems, components, devices (referred to herein collectively and severally as assemblies) and methods disclosed here. Alternative and additional components include those presently known and those developed over time in the future. Certain exemplary embodiments may employ one or more lenses, isolators, mux/demux, ferrules, thermal sensors, thermal controllers, amplifiers, etc., and it will be within the ability of those skilled in the art, given the benefit of this disclosure, to select and employ such elements which are suitable to the intended application of the micro-optic beam splitter assembly. In certain exemplary embodiments employing one or multiple lenses, it will be within the ability of those skilled in the art, given the benefit of this disclosure, to select and employ suitable lenses, including, e.g., collimating lenses and other lenses, such as ball lenses, GRIN lenses, barrel lenses, aspherical lenses, etc. In certain exemplary embodiments an optical multi-filter discriminator along with other components, e.g., lenses, ferrules, etc., necessary or useful for the particular application may be housed in a single housing, optionally in a hermetically or environmentally sealed housing, or in multiple housings. Alternatively, in accordance with certain exemplary embodiments some or all of the components may be unhoused. Certain of the components optionally are packaged separately for convenience of manufacture or use, e.g., to facilitate access to the signals for monitoring, system management or other reasons. Within the housing, sub-assemblies of components may optionally be packaged within sub-housings in certain exemplary embodiments. In general, it will be understood by those skilled in the art, given the benefit of this disclosure, that packaging of various embodiments of the components of systems, devices and methods disclosed here can employ a housing similar in design or principle, for example, to the housings currently used commercially for other optics devices, e.g., in housings known for use in TOSAs such as direct modulated lasers, external modulated lasers, other OSAs, Dense Wavelength Division Multiplexer (DWDM) filters, etc.

Thin-film filters employed in systems, devices and methods disclosed here, e.g., the filters, anti-reflection (A/R) coatings, etc., can be designed and manufactured in accordance with any suitable technology, equipment and techniques now known or known in the future. Suitable filters can be designed in accordance with current techniques, e.g., using commercially available software, such as Essential Macleod software, a comprehensive software package for the design and analysis of optical thin films, TFCalc from Software Spectra Inc., etc.

Suitable filters can be manufactured in accordance with various currently known techniques, such as sputtering evaporation, electron beam gun evaporation, ion-assisted evaporation coating techniques, etc. Numerous suitable materials and manufacturing techniques are commercially available and will be readily apparent to those skilled in the art, given the benefit of this disclosure.

Referring now to the appended drawings, FIG. 1 schematically illustrates a 4-port micro-optic dual beam-splitter assembly 10 configured as a DML. Housing 12 of the assembly contains an optical signal source, specifically, laser chip 16 connected to feed-throughs 14 operative to pass RF and/or DC signals into the housing to the laser. Laser beam 18 travels along the primary optical path to lens 20. Lens 20 collimates the optical signals to isolator 22 which then passes the optical signals (with or without intermediate optical elements) to first and second optical filter chips 24, 26. The first optical filter chip 24 comprises a optical substrate 28 having optical surface 30 and thin-film optical filter 32 on second surface 34. Surface 34 is substantially normal to optical path 18 where it is incident on optical filter 32. Optical tap surface 30 is uncoated and, as oriented in the housing 12, is operative as an optical beam splitter to tap off an optical tap signal to photoreceptor 36. It will be understood that FIG. 1 is highly schematic and that the optical paths through the filter chips and to the photoreceptors is shown in a representative fashion which substantially differs from the actual optical paths. Photoreceptor 36 outputs an optical or electrical tap signal to a corresponding tap signal output port (not shown in FIG. 1). A second thin-film optical filter 38 is provided on surface 40 of second filter chip 26. It can be seen that optical filter 40 faces optical filter 32 across a narrow air gap. Surface 40 is substantially normal to optical path 18 where it is incident on optical filter 38. Filter chip 26 also provides optical tap surface 42 which faces oppositely or otherwise away from filter surface 40. Optical tap surface 40 is thin-film coated and, as oriented in the housing 12, is operative as an optical beam splitter to tap off an optical tap signal to second photoreceptor 46. Photoreceptor 46 outputs an optical or electrical tap signal to a second tap signal output port (not shown in FIG. 1).

Figure 2:
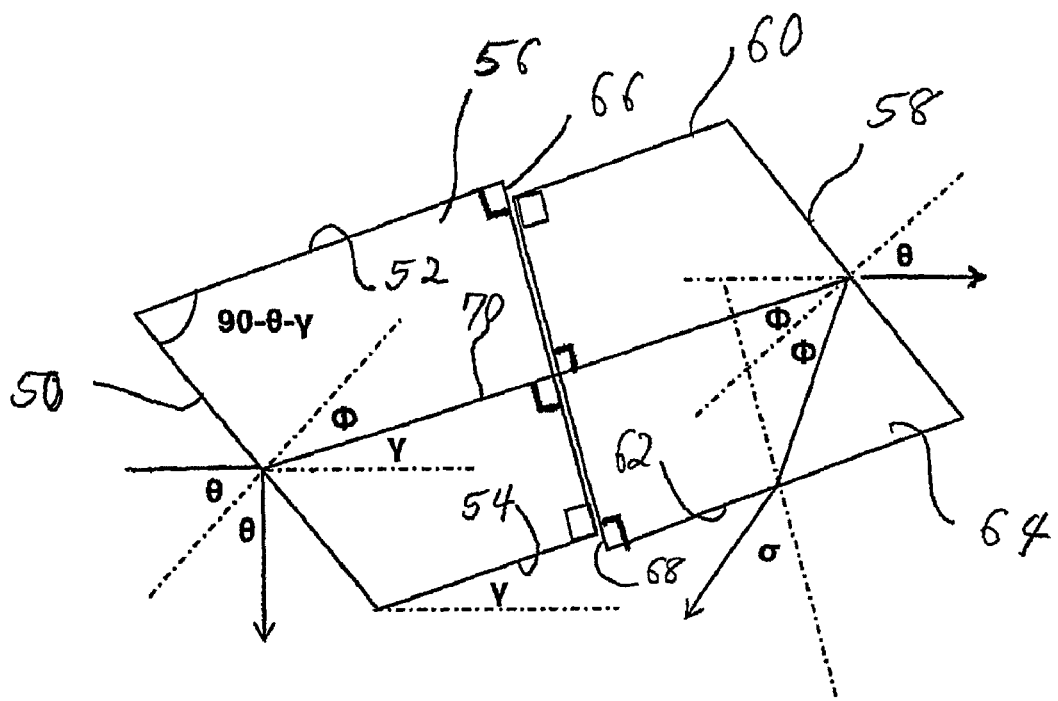
FIG. 2 is a schematic illustration of one exemplary configuration for the dual beam-splitter filter chips of certain embodiments of the micro-optic dual beam-splitter assemblies disclosed here, including at least the DML embodiment of FIG. 1.

Referring now to FIG. 2, one suitable chip geometry is shown for the optical filter chips of a micro-optic dual beam-splitter assembly in accordance with certain exemplary embodiments of the present disclosure. The first optical tap surface 50 is at an angle other than 90° to adjacent third and fourth surfaces 52, 54 of the first optical filter chip 56. The second optical tap surface 58 is at an angle other than 90° to adjacent surfaces 60, 62 of the second optical filter chip 64. The first filter surface 66, while nominally normal to the optical path 70, is at an angle of 90° to the adjacent surfaces 54 and 52 of the first optical filter chip 56 (as indicated in the drawings by the box symbol at the appropriate corners or intersections). It will be understood by those of ordinary skill in the art given the benefit of this disclosure, that reference herein to "90°" means nominally 90°. The second filter surface 68 is nominally normal to the optical path 70 and so is generally approximately parallel to filter surface 66 of chip 56, although preferably a small angle between them is employed to reduce or avoid etaloning between them. Filter surface 68 is at an angle of 90° to the adjacent surface 60 and is at an angle of 90° to the adjacent surface 62 of the second optical filter chip 64. The chip geometry of FIG. 2 is advantageous for at least certain exemplary embodiments, since for each such filter chip typically only one of the main surfaces, e.g., only the tap surface or only the filter surface, would require grinding to the correct angle. The surface(s) can be ground to the desired angle on the wafer, individual chips or strips of chips, and the thin film filter coatings can be deposited, e.g., by sputter coating or other suitable technique, on wafers, individual chips, batches of individual chips, strips of chips, etc. The coated filter surfaces could be the original (i.e., unground) surface of an optical wafer. In this regard, it will be understood by those skilled in the art, that the chip surfaces adjacent to the filter and tap surfaces (e.g., surfaces 52, 54 of the first chip 56) may be surfaces created by cutting or dicing an optical wafer, strip, etc. and, therefore, may be somewhat irregular in smoothness, angle, etc. Optionally, the chip surfaces adjacent to the filter and tap surfaces (e.g., surfaces 52, 54 of the first chip 56 and surfaces 60, 62 of the second chip 64) may have an anti-reflection (A/R) coating. In that regard, it can be seen that the optical tap signal from tap surface 58 is transmitted to a photoreceptor by reflection at surface 58 back through the optical substrate 64 to and through adjacent surface 62.

Figure 3:
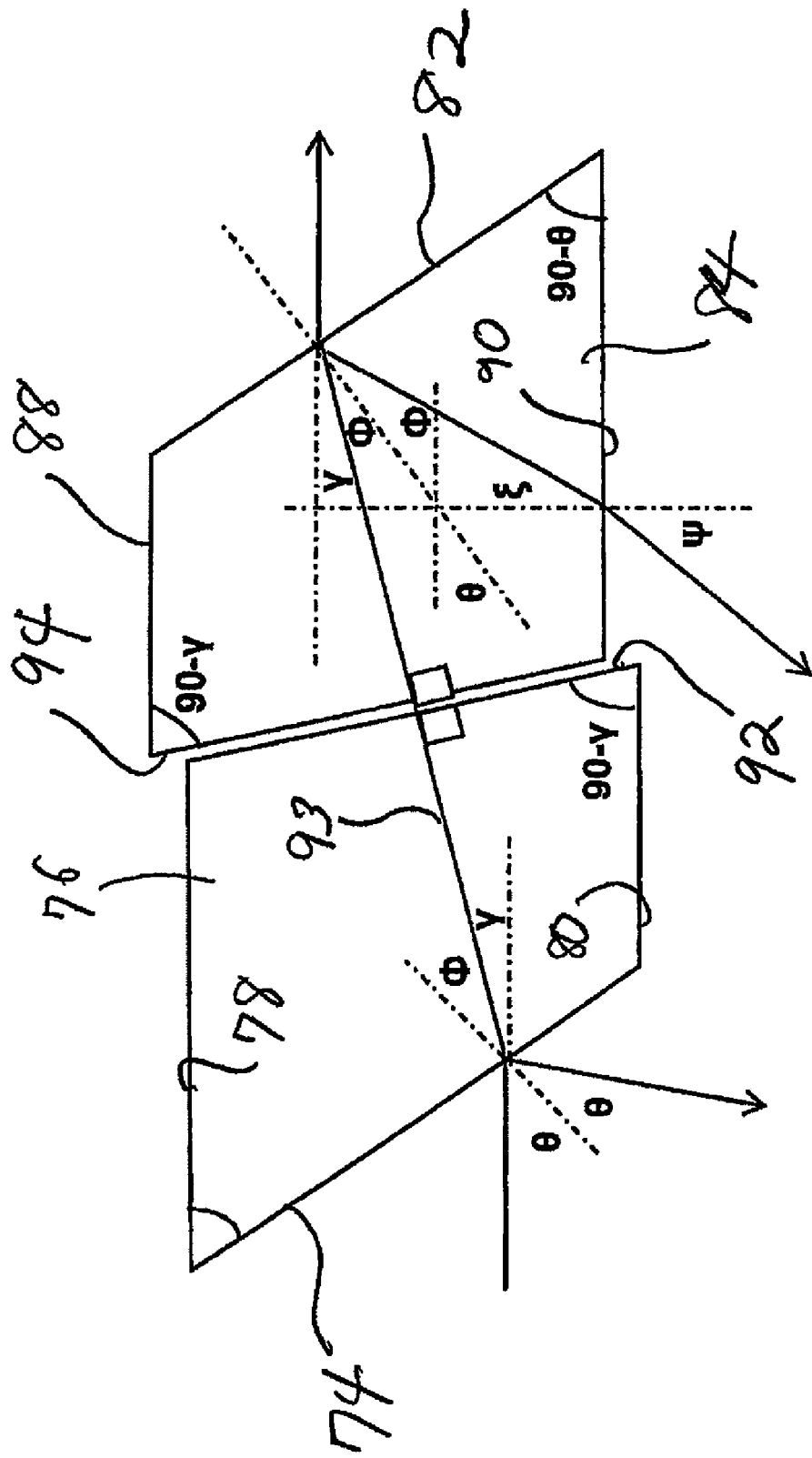
FIG. 3 is a schematic illustration of another exemplary configuration for the dual beam-splitter filter chips of certain embodiments of the micro-optic dual beam-splitter assemblies disclosed here, including at least the DML embodiment of FIG. 1.

Referring now to FIG. 3, another suitable chip geometry is shown for the optical filter chips of a micro-optic dual beam-splitter assembly in accordance with other exemplary embodiments of the present disclosure. In the configuration of FIG. 3, the first optical tap surface 74 of first filter chip 76 is at an angle other than 90° to adjacent surfaces 78, 80. The second optical tap surface, i.e., optical tap surface 82 of optical filter chip 84 is at an angle other than 90° to adjacent surfaces 88, 90. The first filter surface 92, while nominally normal to the optical path 93, is at an angle other than 90° to the adjacent surfaces 78, 80 of the first optical filter chip 76. The second filter surface 94 is nominally normal to the optical path 93 and so is substantially parallel to filter surface 92 of chip 76, although preferably a small angle between them is employed to reduce or avoid etaloning between them. Filter surface 94 is at an angle other than 90° to the adjacent surfaces 88, 90 of the second optical filter chip 84. It can be seen that the optical tap signal from tap surface 82 is transmitted to a photoreceptor by reflection at surface 82 back through the optical substrate 84 to and through adjacent surface 90. Optionally, the chip surfaces adjacent to the filter and tap surfaces may have an A/R coating.

FIG. 4 shows suitable angles for the chip geometries illustrated in FIGS. 2 and 3. The values shown in the sixth through 11th rows in FIG. 4 provide especially advantageous chip sets. In particular, and these values provide good device orientation and beam reflections, low walkoff and otherwise good manufacturability or performance characteristics. The values shown in the sixth row, for example, conveniently employ a 45 degree angle θ.

Figure 5:
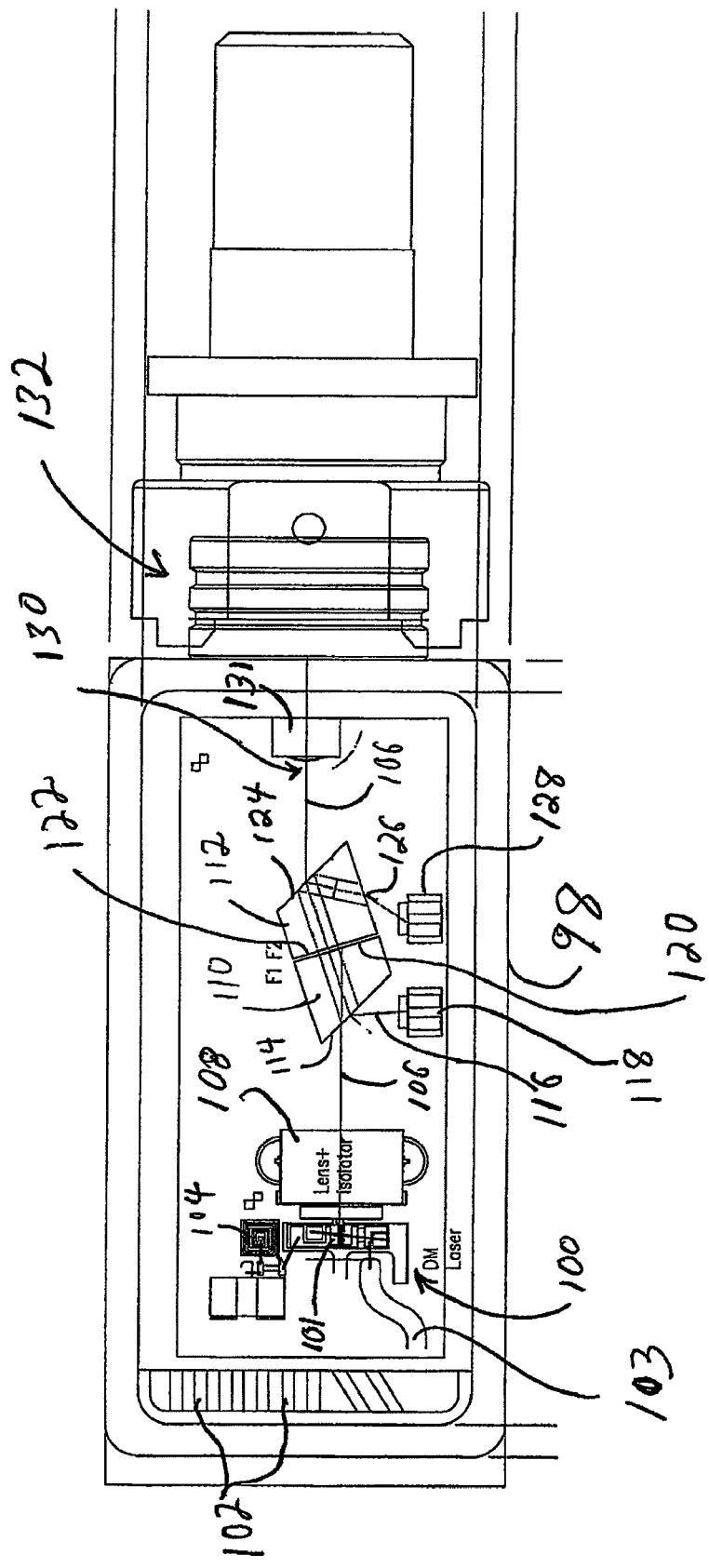
FIG. 5 is a schematic illustration of a suitable component layout for certain exemplary embodiments of the micro-optic dual beam-splitter assemblies disclosed here, specifically, certain DML embodiments.

Referring now to FIG. 5, one suitable micro-optic dual beam-splitter assembly is shown, implemented as a directly modulated laser and configured within housing 98 having dimensions compliant with Multi-source Agreement (MSA) of 10 Gbit/s Miniature Device (XMD), XMD04 Physical Interface of LC TOSA Type 2 Package, Rev. 1.2, Jan. 17, 2006. The optical signal source is provided by laser 100 comprising laser chip 101, fingers of copper traces 103 and/or other electrical connections and feedthroughs 102, an inductor 104 and other components in accordance with known DML laser designs. Optical signals from laser chip 101 are passed along optical path 106 through lens and isolator assembly 108 to first filter chip 110 and second filter chip 112. Tap surface 114 of chip 110 taps off optical tap signal 116 to photoreceptor 118 in which may be, for examples, an optical spectrum analyzer or optical monitor comprising a photodiode for monitoring the optical signal power of the primary optical signal being passed along optical path 106. The facing surfaces 120, 122 of the two filter chips 110, 112, respectively, each has a thin-film optical filter and the two filter chips are operative together as a multi-filter discriminator to improve the optical signals generated by the laser, e.g., to improve the extinction ratio of the signals and their reach. The second tap surface, i.e., surface 124 of chip 112, reflects optical tap signals via optical path 126 to a second photoreceptor 128. Photoreceptor 128 may be, for examples, an optical spectrum analyzer or optical monitor comprising a photodiode for monitoring the wavelength or frequency of the primary optical signals being passed along optical path 106. In accordance with alternative embodiments, the photoreceptors 118, 128 optionally could comprise merely a lens or the like to feed the tap signals as optical signals through corresponding first and second ferrules or other optical ports. Alternatively, any mix and match of photoreceptor's may be employed, as required by or suitable for the intended application. Downstream of the two filter chips, the optical signals continue along optical path 106 directly or indirectly (that is, with or without passing through other elements of the assembly) to an optical output port 130. Optical output port 130 optionally comprises a collimator 131 and/or other lenses, a ferrules, etc. to feed the optical signals to an optical fiber via assembly 132. It will be recognized that in embodiments of the type illustrated in FIG. 5, the output optical signals exit the module assembly via an optical fiber, the laser is modulated electrically, and the output of the photodiodes exits the module electrically.

The optical taps are operative to tap off to the corresponding one of the first and second photoreceptors optical tap signal consisting essentially of a selected set of tap signal wavelengths incident on the tap surface along the optical path and to transmit other wavelengths incident on the tap surface along the optical path. The tap signals optionally do not include the selected set of optical signal wavelengths passed to the main output port by the filter chips. Alternatively, one or both of the tap signals do include a minor portion of such selected set of optical signal wavelengths passed to the main output port. In certain exemplary embodiments either (or both) of the tap surfaces is operative as a broadband optical beam splitter to tap off to the corresponding one of the photoreceptors an optical tap signal comprising essentially all of the wavelengths incident on the tap surface, including at least a portion of the selected set of optical signal wavelengths passed to the main output port.

The micro-optic dual beam-splitter assembly of claim 1 wherein at least one of the first and second photoreceptors is a photodiode mounted in the housing and operative to receive the first or second optical tap signal, respectively, and to generate the corresponding first or second tap signal, respectively, as an electrical signal to the corresponding one of the first and second tap signal output ports.

In certain exemplary embodiments of the micro-optic dual beam-splitter assemblies disclosed here, the optical signal source comprises an optical source lens mounted in the housing and an optical fiber operative to carry optical signals into the housing. For example, the optical filter chips as shown in the embodiment of FIG. 5 could be mounted in a housing or otherwise assembled to receive and filter, e.g. to gain flatten, optical signals carried to the housing or assembly by an optical fiber from an EDFA or other optical amplifier component or device.

Certain exemplary embodiments of the micro-optic dual beam-splitter assemblies disclosed here are athermal, specifically, are operative to perform with little or acceptably low change in optical output characteristics over an operating temperature range. Certain alternative embodiments are not athermal, and may further comprise a temperature controller. For example, certain such embodiments comprise a temperature controller which is in thermal communication with the first and second optical filter chips and is operative to control the temperature of the optical filters or of the assembly generally to thereby adjust the wavelengths passed by the optical filter chips to the main output port. The temperature controller may comprises a thermoelectric cooler, an electrically powered heater, and/or other component(s) operative to control the temperature.

Although the present invention has been described in terms of specific exemplary embodiments, it will be appreciated that various modifications and alterations will be apparent from this disclosure to those skilled in the art, without departing from the spirit and scope of the invention as set forth in the following claims. It should be understood that the use of a singular indefinite or definite article (e.g., "a," "an," "the," etc.) in this disclosure and in the following claims follows the traditional approach in patents of meaning "at least one" unless in a particular instance it is clear from context that the term is intended in that particular instance to mean specifically one and only one. Likewise, the term "comprising" is open ended, not excluding additional items, features, components, etc.

We claim:

1. A micro-optic dual beam-splitter assembly comprising, in combination:
   a. a housing having an optical signal output port, a first tap signal output port, a second tap signal output port, and an optical path in the housing from an optical signal source to the optical signal output port;
   b. a first photoreceptor mounted in the housing;
   c. a second photoreceptor mounted in the housing;
   d. a first optical filter chip in the optical path between the optical signal source and the optical signal output port, comprising a first optical substrate having at least a first filter surface, a first optical tap surface, and a first thin-film optical filter on the first filter surface,
      i. the first thin-film optical filter, as oriented in the housing, being substantially normal to the optical path incident on the first thin-film optical filter, and
      ii. the first optical tap surface, as oriented in the housing, being operative as an optical beam splitter to tap off a first optical tap signal to the first photoreceptor comprising a portion of the optical signals passed along the optical path to the first optical filter chip, and
   e. a second optical filter chip in the optical path between the first optical filter chip and the optical signal output port, comprising a second optical substrate having at least a second filter surface, a second optical tap surface, and a second thin-film optical filter on the second filter surface,
      i. the second thin-film optical filter, as oriented in the housing, being substantially normal to the optical path incident on the second thin-film optical filter; and
      ii. the second optical tap surface, as oriented in the housing, being operative as an optical beam splitter to tap off a second optical tap signal to the second photoreceptor comprising a portion of the optical signals passed along the optical path to the second optical filter chip,
   wherein
      the first optical filter chip and the second optical filter chip, as oriented in the housing, are cooperatively transmissive to the optical signal output port of a selected set of optical signal wavelengths received from the optical signal source along the optical path and are reflective of other wavelengths received from the optical signal source along the optical path,
      the first photoreceptor is operative to receive the first optical tap signal and to pass a corresponding first tap signal to the first tap signal output port, and the second photoreceptor is operative to receive the second optical tap signal and to pass a corresponding second tap signal to the second tap signal output port.

2. The micro-optic dual beam-splitter assembly of claim 1 wherein at least one of the first and second optical tap surfaces is operative as an optical beam splitter:
   to tap off to the corresponding one of the first and second photoreceptors the first or second optical tap signal, respectively, consisting essentially of a selected set of tap signal wavelengths incident on the tap surface along the optical path, and
   to transmit other wavelengths incident on the tap surface along the optical path.

3. The micro-optic dual beam-splitter assembly of claim 2 wherein the selected set of tap signal wavelengths does not include the selected set of optical signal wavelengths.

4. The micro-optic dual beam-splitter assembly of claim 2 wherein the selected set of tap signal wavelengths does include the selected set of optical signal wavelengths.

5. The micro-optic dual beam-splitter assembly of claim 1 wherein at least one of the first and second optical tap surfaces is operative as a broadband optical beam splitter to tap off to the corresponding one of the first and second photoreceptors the first or second optical tap signal, respectively, consisting essentially of wavelengths incident on the first or second optical tap surface, respectively, including at least a portion of the selected set of optical signal wavelengths received by the first and second optical filter chips from the optical signal source along the optical path.

6. The micro-optic dual beam-splitter assembly of claim 1 wherein at least one of the first and second photoreceptors is a photodiode mounted in the housing and operative to receive the first or second optical tap signal, respectively, and to generate the corresponding first or second tap signal, respectively, as an electrical signal to the corresponding one of the first and second tap signal output ports.

7. The micro-optic dual beam-splitter assembly of claim 1 wherein at least one of the first and second tap signal output ports is an optical port operative to receive the first or second optical tap signal, respectively, and to pass the corresponding first or second tap signal, respectively, as an optical signal to the corresponding one of the first and second tap signal output ports.

8. The micro-optic dual beam-splitter assembly of claim 7 wherein
   the first photoreceptor comprises a first optical tap lens mounted in the housing and operative to receive the first optical tap signal and to pass the corresponding first tap signal as an optical signal to the first tap signal output port,
   the first tap signal output port comprises a first tap ferrule operative to receive and carry optical signals from the first photoreceptor out of the housing, and
   the second photoreceptor comprises a second optical tap lens mounted in the housing and operative to receive the second optical tap signal and to pass the corresponding second tap signal as an optical signal to the second tap signal output port, and
   the second tap signal output port comprises a second tap ferrule operative to receive and carry optical signals from the second photoreceptor out of the housing.

9. The micro-optic dual beam-splitter assembly of claim 1 wherein the optical signal source comprises an optical source lens mounted in the housing and an optical fiber operative to carry optical signals into the housing.

10. The micro-optic dual beam-splitter assembly of claim 1 wherein the optical signal source comprises a laser mounted in the housing and feed-throughs operative to pass RF and DC signals into the housing to the laser.

11. The micro-optic dual beam-splitter assembly of claim 10 wherein the laser comprises a directly modulated laser.

12. The micro-optic dual beam-splitter assembly of claim 1 wherein the optical signal source comprises an optical amplifier.

13. The micro-optic dual beam-splitter assembly of claim 12 wherein the optical amplifier comprises erbium doped optical fiber and the first optical filter chip and the second optical filter chip, as oriented in the housing, are cooperatively operative as gain-flattening filters for optical signals amplified by the optical amplifier.

14. The micro-optic dual beam-splitter assembly of claim 1 which is operative as a TOSA and wherein the housing has overall dimensions compliant with Multi-source Agreement (MSA) of 10 Gbit/s Miniature Device (XMD), XMD04 Physical Interface of LC TOSA Type 2 Package, Rev. 1.2, Jan. 17, 2006.

15. The micro-optic dual beam-splitter assembly of claim 1 wherein the second optical tap surface, as oriented in the housing, is operative to reflect the second optical tap signal through the second optical filter chip to and through a third surface of the second optical filter chip.

16. The micro-optic dual beam-splitter assembly of claim 15 wherein the third surface of the second optical filter chip has an anti-reflective coating.

17. The micro-optic dual beam-splitter assembly of claim 1 wherein the first filter surface and the second filter surface face each other across an air gap.

18. The micro-optic dual beam-splitter assembly of claim 17 wherein:
   the first optical tap surface is at an angle other than 90° to adjacent third and fourth surfaces of the first optical filter chip,
   the second optical tap surface is at an angle other than 90° to adjacent third and forth surfaces of the second optical filter chip,
   the first filter surface is at right angles to the adjacent third and fourth surfaces of the first optical filter chip, and
   the second filter surface is at right angles to the adjacent third and fourth surfaces of the second optical filter chip.

19. The micro-optic dual beam-splitter assembly of claim 17 wherein:
   the first optical tap surface is at an angle other than 90° to adjacent third and fourth surfaces of the first optical filter chip,
   the second optical tap surface is at an angle other than 90° to adjacent third and fourth surfaces of the second optical filter chip,
   the first filter surface is at an angle other than 90° to the adjacent third and fourth surfaces of the first optical filter chip, and
   the second filter surface is at an angle other than 90° to the adjacent third and fourth surfaces of the second optical filter chip.

20. The micro-optic dual beam-splitter assembly of claim 1 wherein at least one of the first optical tap surface and the second tap surface is uncoated.

21. The micro-optic dual beam-splitter assembly of claim 1 wherein the assembly is athermal.

22. The micro-optic dual beam-splitter assembly of claim 1 wherein the assembly further comprises a temperature controller which is in thermal communication with the first and second optical filter chips and operative to adjust the wavelengths passed by the first and second optical filter chips.

23. A micro-optic dual beam-splitter assembly comprising, in combination:
   a. a first photoreceptor;
   b. a second photoreceptor;
   c. a first optical filter chip in the optical path between the optical signal source and the optical signal output port, comprising a first optical substrate having at least a first filter surface, a first optical tap surface, and a first thin-film optical filter on the first filter surface,
      i. the first thin-film optical filter being oriented substantially normal to the optical path incident on the first thin-film optical filter, and
      ii. the first optical tap surface being operative as an optical beam splitter to tap off a first optical tap signal to the first photoreceptor comprising a portion of the optical signals passed along the optical path to the first optical filter chip, and
   d. a second optical filter chip in the optical path between the first optical filter chip and the optical signal output port, comprising a second optical substrate having at least a second filter surface, a second optical tap surface, and a second thin-film optical filter on the second filter surface,
      i. the second thin-film optical filter being oriented substantially normal to the optical path incident on the second thin-film optical filter; and
      ii. the second optical tap surface being operative as an optical beam splitter to tap off a second optical tap signal to the second photoreceptor comprising a portion of the optical signals passed along the optical path to the second optical filter chip,
   wherein
      the first optical filter chip and the second optical filter chip are oriented to be cooperatively transmissive to the optical signal output port of a selected set of wavelengths received from the optical signal source along the optical path and are reflective of other wavelengths received from the optical signal source along the optical path
      the first photoreceptor is operative to receive the first optical tap signal and to pass a corresponding first tap signal, and
      the second photoreceptor is operative to receive the second optical tap signal and to pass a corresponding second tap signal.

24. A micro-optic dual beam-splitter assembly comprising, in combination:
   a. a housing having an optical signal output port and an optical path in the housing from an optical signal source to the optical signal output port;
   b. at least a first photoreceptor mounted in the housing;
   c. a first optical filter chip in the optical path between the optical signal source and the optical signal output port, comprising a first optical substrate having at least a first filter surface, a first optical tap surface, and a first thin-film optical filter on the first filter surface,
      i. the first thin-film optical filter, as oriented in the housing, being substantially normal to the optical path incident on the first thin-film optical filter, and
      ii. the first optical tap surface, as oriented in the housing, being operative as an optical beam splitter to tap off a first optical tap signal comprising a portion of the optical signals passed along the optical path to the first optical filter chip, and
   d. a second optical filter chip in the optical path between the first optical filter chip and the optical signal output port, comprising a second optical substrate having at least a second filter surface, a second optical tap surface, and a second thin-film optical filter on the second filter surface,
      i. the second thin-film optical filter, as oriented in the housing, being substantially normal to the optical path incident on the second thin-film optical filter; and
      ii. the second optical tap surface, as oriented in the housing, being operative as an optical beam splitter to tap off a second optical tap signal comprising a portion of the optical signals passed along the optical path to the second optical filter chip,
   wherein
      the first optical filter chip and the second optical filter chip, as oriented in the housing, are cooperatively transmissive to the optical signal output port of a selected set of optical signal wavelengths received from the optical signal source along the optical path and are reflective of other wavelengths received from the optical signal source along the optical path,
      the first photoreceptor is operative to receive at least one of the first and second optical tap signals and to pass a corresponding first tap signal to a first tap signal output port.

25. The micro-optical dual beam splitter assembly of claim 24 further comprising a second photoreceptor operative to receive at least one of the first and second optical tap signals and to pass a corresponding second tap signal to a second tap signal output port.

* * * * *